Sept. 22, 1936.   H. DEL MAR   2,054,791
HOT WATER STORAGE TANK
Filed June 17, 1932
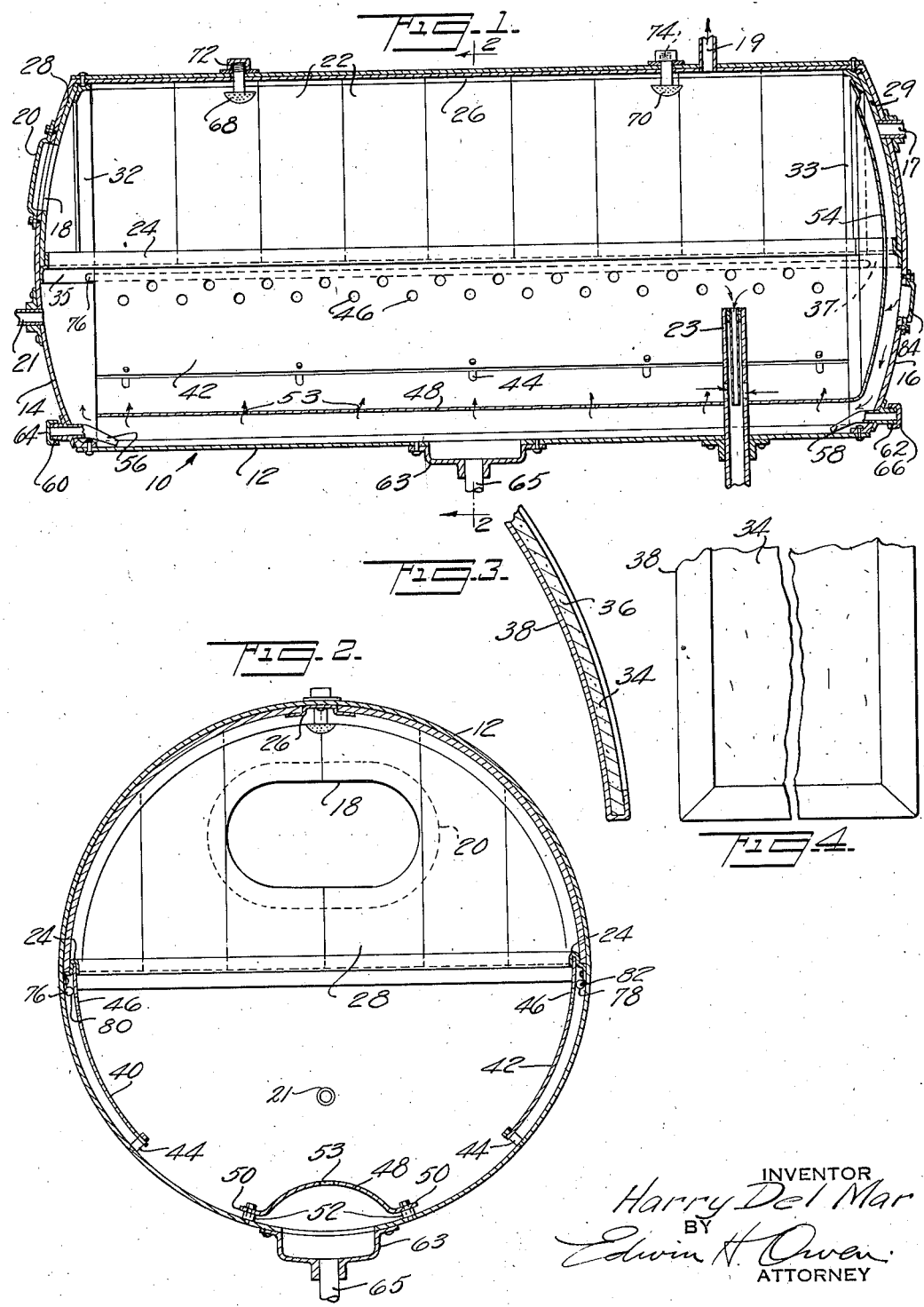
INVENTOR
Harry Del Mar
BY
Edwin H. Owen
ATTORNEY Patented Sept. 22, 1936

2,054,791

UNITED STATES PATENT OFFICE 2,054,791

HOT WATER STORAGE TANK

Harry Del Mar, New York, N. Y.

Application June 17, 1932, Serial No. 617,749

10 Claims. (Cl. 210—15)

My invention relates to an improved hot water storage tank and presents certain new and improved features which result in a purer water supply therefrom, an improved distribution of water throughout the tank, and an improved flushing system for periodical cleaning.

The collection of mineral and vegetable sediment and particles of corrosive matter circulate within the water in the common types of hot water storage tanks now in use, which tend to contaminate the water supply, the mineral and vegetable sediment coming in with the water supply and the corrosion forming on the inner surface of the metallic tank.

The principal object of this invention is to minimize corrosion and pitting within the tank by providing a non-corrosive lining for that portion of the tank in which corrosion takes place most rapidly, also to provide a baffle means to deflect the sediment which accumulates in the tank, within a restricted area, where it will be least disturbed by the action of the circulation of the water within the tank, at times when water is withdrawn through the faucets.

Another object is to provide a preheating member for the cold water supply and means for distributing the preheated supply throughout the length of the tank.

Another object is to provide a flushing means which can be operated from the exterior of the tank to clean the interior of the tank.

Still another object is the arrangement of a sectional non-corrosive lining which can be installed in certain tanks now in use, which are provided with a manhole opening.

On examination of the common types of hot water storage tanks now in use, it has been found that after a period of two to four years, the upper part of the tank becomes corroded and pitted, and that most of said corrosion and pitting takes place near the top of the tank which gradually diminishes in intensity toward the center of the tank wall. Very little corrosion if any, has been found to occur below the center of the wall. To overcome this defect I propose to line only the upper half of the tank wall with some non-corrosive metal such as copper or the like.

A collection of sediment settles along the bottom and part way up the side walls, the upper strata of which is disturbed each time a faucet is turned on, when there is a general disturbance and circulation of the water, which stirs up the said sediment. Such disturbance is now minimized by a system of baffle plates which are placed along the lower part of the walls of the tank, and a hood placed at the bottom thereof, the tendency of which is to confine the sediment beneath the hood, or cause a portion of same to be drawn along the wall surface to a confined area behind the baffle plates.

A cold water preheating member is provided in the form of a shield over the inner surface of one head of the tank, against which the cold water supply will flow as it enters the tank, and by the transfer of heat therefrom, said water will be tempered. The passage of this tempered water is then directed beneath the hood at the bottom of the tank and reaches the main water area through a number of apertures in the upper surface thereof, which distribute the tempered water throughout the length of the tank.

In addition to the means for minimizing the sediment flow into the hot water, and tempering the cold water supply, a flushing system is also provided to flush out the interior of the tank, by attaching a series of hose connections to threaded nipples on the outside of the tank which are joined to flushing nozzles inside of the tank. The outside threaded nipples are kept closed when not in use by a cap or a valve.

In the drawing I have shown a preferred embodiment of my invention in which,

Fig. 1 shows a longitudinal section through a water tank,

Fig. 2 is a vertical section taken on the lines 2—2 on Fig. 1,

Fig. 3 is a sectional view through a portion of reinforced section of a lining member and Fig. 4 is an elevational view of the lining member shown in Fig. 3.

The structure comprises the tank 10 which is composed of the usual cylindrical casing 12, having heads 14—16, secured thereto, and a manhole 18, with a cover member 20 on one of the heads. Cold water inlet and hot water outlet pipes are located at 17 and 19 respectively, and the heating means is supplied by a direct piping connection to a water heater situated below the tank level through which the water of the tank circulates. The hot water enters the tank 10 from the heater through a pipe 21 in the head 14, and passes back to the heater through a pipe 23 in the bottom of the tank. Said pipe 23 projects upward toward the central portion of the tank and has a central tube therein spaced from the side walls of said pipe through which clear warm water from the upper area of the tank will flow. Openings are also provided in the lower portion of the pipe through which colder water from the lower part of the tank will flow and mix with the warmer water which passes through central tube to thus temper the cold water before it returns to the heater. The pipe and openings therein are further located above a sediment restricting member, which will be hereinafter referred to to reduce the sediment deposit in the heater pipes and increase the heating efficiency. Any other suitable heating system may be used if desired, such as running pipes through the tank, which have steam or some other heating medium passed therethrough.

A lining of some non-corrosive material such as copper or the like is provided for the upper half of the casing 12 and preferably comprises a number of concave sectional plates 22, which are supported within the tank by suitable racks indicated at 24—26, along the sides and top of said tank. The upper half of the heads 14 and 16, are also lined with non-corrosive metal plates 28—29, which are supported in circumferential brackets 32—33 and bottom brackets 35—37. The lining can either be made in short sectional form as indicated in Fig. 1, or it may be made in longer lengths if desired, the assembly of which would depend upon whether the lining was to be placed in a new tank or an old one. For instance, if an old tank was to receive the lining, it would be necessary to use a short sectional form of lining, since these could be slipped through the open manhole 18 and assembled without removing the heads from the tank; while in a new tank, it would be preferable to use a lining in longer sections. This same principle applies to the lining of the ends also.

In Figs. 3 and 4, details are shown of a sectional lining with a filler or backing member 34, of some metal or an insulating substance as indicated at 36, which is covered with a sheathing of thin non-corrosive metal 38.

Two baffle plates 40—42, are placed along the lower side walls in spaced relation thereto, and are secured along the upper ends to the side brackets 24—24, and along the lower ends by studs 44. Since the lower ends of the baffles rest upon the studs 44, a passage is provided for water to pass thereunder, and circulation is encouraged by means of openings 46, along the upper end of said baffle plates through which water can flow.

A hood 48 of semi-cylindrical shape, is supported along its flanged edges 50—50 on collars 52, in spaced relation to the lower inner surface of the casing 12, and is provided with a number of openings 53 in the upper surface thereof, also for the purpose of allowing water to pass through.

A shield 54 is mounted in spaced relation to the head 16 in such manner, that the cold water entering through the inlet passage 17, flows against said shield, which shield transfers heat to the cold stream flowing against it, thereby tempering same and also directs the tempered stream downward beneath the hood member 48, where it mixes with the tank water and circulates upward through the openings 53, which circulation equally distributes said stream throughout the length of the tank. The preheating of the water in this manner tends to provide a more uniform temperature for the water in the lower half of the tank.

The sediment which is brought in with the inlet water supply, is deposited upon the floor of the tank, the greater portion of which is restricted to the space beneath the hood 48, and along the wall surface back of the baffle plates 40—42. The part which passes behind the baffle plates 40—42, is assisted in its passage thereunder by the circulation of the water from the lower open end of the baffles, up and through the openings 46 at the upper end of said baffles, which circulation tends to draw the sediment under the said plates 40—42 where it is less likely to be disturbed when faucets are opened and circulation is rapid.

From the foregoing, it will be observed that a purer water supply can be obtained, since corrosion and pitting of the tank is practically eliminated by the non-corrosive lining covering such parts of the tank that are particularly susceptible to corrosion and pitting, and since the sediment collection is confined behind the baffles and hood, which prevents same from readily circulating with the main body of the water.

In order to still further improve the quality of the water, it is desirable to flush the tank of sediment periodically. In order to make this operation as simple as possible I propose to install flushing nozzles at the most advantageous points within the tank, and provide same with threaded nipples outside of the tank, so that by attaching hose couplings to said threaded nipples, all of the inside surface of the tank can be quickly and thoroughly cleaned when a charge of water is sprayed thereover. Since flushing members are provided in the following manner:

At the bottom of each head 14—16, there are located nozzles 56—58, which nozzles have their outlet ends projecting into the tank 10, and are particularly directed to discharge a stream of water both ways along the bottom of said tank beneath the hood 48. Said nozzless 56—58 are secured to their respective heads 14 and 16, and are provided at their outer ends with threaded portions 60—62, on which hose couplings are adapted to be mounted for flushing purposes, or on which caps 64—66 are secured when the hose couplings are removed. A drain basin 63 is provided at the bottom of the tank, in the form of a dished structure, into which the sediment is flushed, and is drawn off through a blow down pipe 65 inserted into the bottom of said basin.

Another pair of flush nozzles 68—70, are provided at the top of the tank, which have their outlet ends projecting into the tank and the inlet ends projecting outside of the tank. Threaded coupling ends 72—74 are also provided for hose connections. When a stream of water is ejected from said nozzles it is directed over the copper lining plates.

A third flushing apparatus is provided at the upper portions of the baffle plates 40—42, at 76—78, which comprises pipes 80—82, extending approximately the length of the tank and have apertures along their lower surface which direct the water flows against the wall to dislodge the sediment adhering thereto. Outside coupling connections (not shown) are provided for these flushing pipes also. A hose may also be inserted into opening 84.

In the structure above described a new and improved tank has been provided which not only improves the quality of the water therein but also provides a tank which will give service for a greater length of time than the tanks now in use due to the fact that the corrosion and pitting of the tank is practically eliminated.

Various changes can be made in the details of construction here shown and described as forming this invention, any such modifications still being within the scope of the invention here claimed, if the principles of construction and results above described are substantially preserved.

Having described my invention, I claim:

1. In a hot water storage tank, comprising in combination a tank casing having a non-corrosive lining over the upper portion of the interior wall surface thereof, sediment deflecting baffle plates extending along the lower portion of said interior wall surface and in spaced relation thereto, means for preheating the cold water supply, and means for evenly distributing the preheated water supply throughout the length of said tank.

2. In a hot water storage tank comprising in combination a tank casing having a non-corrosive lining over the upper half of the interior wall surface thereof, and sediment deflecting baffle plates adjoining said lining, and extending into the lower portion in spaced relation to the interior wall of said tank.

3. In a hot water storage tank, the combination of a shell having a closure head at each end thereof, a non-corrosive lining for a portion of the interior wall of said shell and sediment deflecting and restricting members including oppositely disposed shields along the lower walls of said shell in spaced relation thereto, and a hood along the lower surface of said tank.

4. In a hot water storage tank, the combination of a shell having a closure head at each end thereof, and a non-corrosive lining for a portion of the interior wall of said shell including non-corrosive metal plates applied to the upper half of the said shell and head.

5. In a hot water storage tank, the combination of a shell having a closure head at each end thereof including a water inlet connection in one head, and a preheating and distributing member including a shield covering the inner surface of the head having the water inlet connection and in spaced relation thereto, and a perforated hood extending along the bottom of the tank and adjoining said shield, whereby the water is first tempered then distributed throughout the length of said tank.

6. In a hot water storage tank, the combination of a tank casing, a non-corrosive lining covering a portion of the interior thereof, sediment deflecting and restricting members adapted to restrict the passage of sediment into the main water area, inlet and return water heating tubes adapted to supply the heated water for said tank, the mouth of said return tube extending above the sediment level.

7. The combination with a hot water storage tank of a sectional non-corrosive lining for the upper half of the interior of said tank, comprising a plurality of concave plates of non-corrosive metal, placed along the wall in close contact therewith and supported by brackets engaging the upper and lower edges thereof, said brackets being secured to the tank wall.

8. In an improved hot water storage tank, comprising a shell having a closure head at each end thereof, water supply inlet and outlet connections and water heating pipe members through which the storage supply circulates and which are heated by a remote heating means, said above recited structure in combination with, a sectional non-corrosive lining covering the upper half of the inner surface of said shell and heads, sediment deflecting baffle plates placed along the lower wall surface, water tempering and distributing members comprising a shield extending into the hot water portion, against which the cold water supply is adapted to flow and a perforated hood along the bottom of said shell through which the tempered water is directed after leaving said shield, an externally controlled internal flushing system and a drain basin at the bottom of said shell through which the sediment and water can flow.

9. In a hot water storage tank comprising a shell having a closure head at each end thereof, and water inlet and outlet supply connections attached thereto, in combination with a system for improving the quality of water drawn off from said tank, and improving the water heating and circulation, comprising water heating pipe members entering said tank, through which the tank water flows, one of said pipe members extending into said tank and adapted to receive a warm water supply through the mouth thereof and a cooler water supply through side apertures therein both of which openings are located above the normal sediment level, a non-corrosive lining for a portion of the inner wall surface of said tank, sediment restricting baffle plates, a water tempering and distributing system, and an externally controlled flushing system.

10. A water return connection for a hot water storage tank, comprising a pipe extending into the storage tank and having openings at the side thereof above the normal sediment level through which the colder water at the lower level of the tank will be drawn off, and a central tube within said pipe extending downward from the mouth thereof, through which pipe warm water from a higher level in the tank will be drawn downward and directed to mix with and temper the water drawn off through the said side openings before the return of said water to a heating source.

HARRY DEL MAR.